US009838557B2

(12) United States Patent
Tsongas et al.

(10) Patent No.: US 9,838,557 B2
(45) Date of Patent: Dec. 5, 2017

(54) SYSTEMS AND METHODS FOR IMPLEMENTING USER-INTERACTIVE DELAYED PRINTING IN IMAGE FORMING DEVICES

(71) Applicant: XEROX Corporation, Norwalk, CT (US)

(72) Inventors: Jason C. Tsongas, Rochester, NY (US); Matthew O. Scrafford, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/776,649

(22) Filed: Feb. 25, 2013

(65) Prior Publication Data
US 2014/0240736 A1    Aug. 28, 2014

(51) Int. Cl.
*H04N 1/00* (2006.01)
*G06F 3/12* (2006.01)

(52) U.S. Cl.
CPC ....... *H04N 1/00896* (2013.01); *G06F 3/1221* (2013.01); *G06F 3/1229* (2013.01); *G06F 3/1267* (2013.01); *H04N 1/00222* (2013.01); *H04N 1/00413* (2013.01); *H04N 2201/0072* (2013.01); *H04N 2201/0075* (2013.01); *H04N 2201/0081* (2013.01); *H04N 2201/0082* (2013.01); *H04N 2201/0091* (2013.01); *H04N 2201/0093* (2013.01); *H04N 2201/0094* (2013.01); *Y02B 60/1271* (2013.01)

(58) Field of Classification Search
CPC ... G03G 15/5004; G06F 3/126; G06F 3/1267; G06F 1/3203; G06F 1/3284; G06F 3/1229; G06F 3/1221; H04N 1/00896; H04N 1/00222; H04N 1/00413; H04N 2201/0072; H04N 2201/0075; H04N 2201/0081; H04N 2201/0082; H04N 2201/0091; H04N 2201/0093; H04N 2201/0094; Y02B 60/1271
USPC ......................................................... 399/70
See application file for complete search history.

(56) References Cited

U.S. PATENT DOCUMENTS

| | | | | |
|---|---|---|---|---|
| 7,064,854 B2* | 6/2006 | Idehara | ............. | G03G 15/2003 358/1.14 |
| 7,295,786 B2 | 11/2007 | Brinsley | | |
| 7,593,661 B2* | 9/2009 | Watanabe | .......... | G03G 15/5004 399/70 |
| 8,213,811 B2* | 7/2012 | Takatani | ............ | G03G 15/5004 399/37 |
| 8,934,126 B1* | 1/2015 | Masuyama | ........... | G06F 3/1221 358/1.14 |

(Continued)

*Primary Examiner* — Walter Yehl
(74) *Attorney, Agent, or Firm* — Caesar Rivise, PC (57) ABSTRACT

A system and method are provided for implementing more efficient printing in image forming devices by providing a user-interactive scheme for delaying printing of individual user-requested print operations when an individual image forming device to which a specific user-requested printing operation is directed is determined to be in a power saving mode. The disclosed system and method may determine whether a requested image forming device is in a power saving mode at the time that a user requests an image forming operation and automatically present to the user a formatted user interface page on a display at the user workstation. The formatted user interface may provide the user with an option to direct the image forming device to delay (hold) executing the requested image forming operation until some additional condition is met.

24 Claims, 4 Drawing Sheets

(56) References Cited

U.S. PATENT DOCUMENTS

| | | | | |
|---|---|---|---|---|
| 9,285,732 | B2* | 3/2016 | Shibahara | G03G 15/205 |
| 9,329,824 | B2* | 5/2016 | Gray | G06F 3/1285 |
| 2004/0136025 | A1* | 7/2004 | Moriyama | H04N 1/00002 |
| | | | | 358/1.14 |
| 2006/0269341 | A1* | 11/2006 | Aoki | G03G 15/5004 |
| | | | | 400/62 |
| 2007/0139698 | A1* | 6/2007 | Sato | G06F 3/1219 |
| | | | | 358/1.15 |
| 2007/0165262 | A1* | 7/2007 | Watanabe | G03G 15/5016 |
| | | | | 358/1.14 |
| 2007/0212092 | A1* | 9/2007 | Tsujimura | G03G 15/205 |
| | | | | 399/69 |
| 2008/0186524 | A1* | 8/2008 | Morimoto | G03G 15/5004 |
| | | | | 358/1.13 |
| 2009/0138878 | A1* | 5/2009 | Fernstrom | G06F 1/3203 |
| | | | | 718/102 |
| 2009/0328159 | A1* | 12/2009 | Luo | G06F 21/608 |
| | | | | 726/4 |
| 2010/0149576 | A1* | 6/2010 | Morihara | G06K 15/1822 |
| | | | | 358/1.13 |
| 2010/0188698 | A1* | 7/2010 | Koizumi | G03G 15/5004 |
| | | | | 358/1.15 |
| 2010/0226662 | A1* | 9/2010 | Takatani | G03G 15/5004 |
| | | | | 399/8 |
| 2011/0069343 | A1* | 3/2011 | Tsuchitoi | G06F 1/3215 |
| | | | | 358/1.15 |
| 2011/0164278 | A1* | 7/2011 | Yamakawa | G06F 3/1221 |
| | | | | 358/1.15 |
| 2011/0176826 | A1* | 7/2011 | Yamamichi | G03G 15/5004 |
| | | | | 399/83 |
| 2011/0255129 | A1* | 10/2011 | Tamura | G06F 3/1221 |
| | | | | 358/1.15 |
| 2012/0076523 | A1* | 3/2012 | Kojima | G03G 15/2039 |
| | | | | 399/70 |
| 2012/0162692 | A1* | 6/2012 | Aida | G03G 15/5004 |
| | | | | 358/1.14 |
| 2014/0376024 | A1* | 12/2014 | Masuyama | G06F 3/1221 |
| | | | | 358/1.14 |

* cited by examiner

SYSTEMS AND METHODS FOR IMPLEMENTING USER-INTERACTIVE DELAYED PRINTING IN IMAGE FORMING DEVICES

BACKGROUND

1. Field of Disclosed Subject Matter

This disclosure relates to systems and methods for implementing more efficient operations of image forming devices by providing a user-interactive scheme for delaying printing of individual user-requested print operations when an individual image forming device to which the user-requested print operations are directed is determined to be in a power saving mode.

2. Related Art

Modern office and other production workspace environments make beneficial use of myriad electronic devices in direct and networked communication with each other. These connected electronic devices streamline communications between individuals in the organization and accomplishment of production tasks by the organization. Individual user workstations, accessible by one or more users, are employed to provide the platform that facilitates user interaction with the production devices. Outputs from individual user workstations may include point-to-point interactive communications, digital data outputs (raw and/or analyzed) often stored for further analysis or other uses, operating instructions for one or more production devices and other like outputs.

The proliferation of electronic devices places increased burdens, physical and economic, on a user organization particularly with regard to providing power to the devices and in paying for the power consumed by the devices. In an effort to mediate these costs, electronic "brains" associated with the individual user workstations, and with the other devices with which those user workstations communicate, often include processing modes, ranging from simple to sophisticated, that place the individual devices into power saving conditions or modes during periods of relative and/or measured inactivity. Often referred to as "sleep" or "stand-by" modes, these power saving conditions or modes of operation cause the devices to be maintained in some level of powered-up preparedness with some monitoring capacity for incoming commands to operate the devices.

In office workspace environments, particular devices, which make significant beneficial use of less-than-fully-operational power saving modes, are the many and widely varied types and classes of image forming devices. These devices tend to be subjected individually to significant or extended periods of inactivity. When, however, a device is tasked by a user sending a user-requested image forming operation to the device, the user would generally like to know that the user-requested image forming operation is being accomplished in an expeditious, or at least an expected, manner. This is particularly the case when the image forming device is positioned remotely from the user workstation. The user may want to know, for example, that the user-requested image forming operation is complete prior to going to the remotely-positioned image forming device to retrieve the product of the completed image forming operation.

Image forming devices, including, but not limited to, copiers, printers, scanners, facsimile units and multi-function devices (MFDs) incorporating a plurality of these functions, are familiar in office workspace environments. Depending on the function, the image forming device may include several time-consuming "warm-up" steps once turned ON to be readied to perform the available image forming functions. Hardware components may, for example, need to be activated to achieve certain operating parameters, including being heated to a certain operating temperature, accelerated to a certain operating speed, raised to a certain level of operating luminescence or charged to a certain operating charge level, prior to signaling readiness of the image forming device to perform the image forming functions. Software components may, for example, need to execute some form of "boot up" routine prior to becoming active. Separately, processing components may need to assess and/or collect stored data in order that an interpreter or equivalent operating routine, which may be required to process incoming image data and layout instructions, is made available to convert the data and instructions into a particular form that is usable by the hardware components.

Based on the above, overall operations for image forming devices may benefit significantly from the provision of separate active (operating) and inactive (sleep or stand-by) modes. The ability to switch between the inactive mode and the active mode balances power conservation with operational efficiency. Anyone who operates image forming devices understands that these devices consume significantly less energy in the inactive mode than they do in the active mode. The inactive mode is equally useful in maintaining hardware and software components in a semi-ready state to abbreviate the time expended in performing the steps necessary to go from the inactive mode to the active mode.

SUMMARY OF THE DISCLOSED EMBODIMENTS

Even as image forming devices have evolved in becoming more capable and sophisticated, the requirements to more economically operate the devices have significantly increased. In modern image forming devices, individual image forming operations are more economically undertaken. Efforts at overall economically operating the devices has focused not only on the image forming processes themselves, but also on the warm-up times and tasks for particular image forming devices, which may themselves be major sources of time and energy consumption. Not only is it understood that the time and energy consumption is significant when going from an OFF to an ON condition in an image forming device, but it is also measurably significant for each transition from an inactive mode to an active mode in many image forming devices. Based on these operating characteristics, there has emerged a desire to lessen a number of cycles from an inactive mode to an active mode that the image forming device undertakes during a given operating period, i.e., that period from when the image forming device is turned ON and allowed to warm-up to when the image forming device is ultimately powered OFF.

Conventionally, each time a user sent an image forming operation request or command to an image forming device for processing, that submission would cause the image forming device, while in an inactive or power saving mode, to immediately exit the inactive or power saving mode and transition to the active (operating) mode. Bringing the image forming device randomly out of the power saving mode for each print job that was sent to the image forming device, regardless of a size of the print job, required what were deemed to be too many recurring periods of increased power consumption associated with these transitions. This phenomenon was viewed as having a direct and significant financial impact on the organizations operating the devices.

Efforts were undertaken to provide some intelligent manner by which to reduce the number of random cycles in the image forming device from inactive to active, while maintaining the image forming device in an inactive state throughout most of an ON condition period. U.S. Pat. No. 7,295,786 to Brinsley, which issued on Nov. 13, 2007, and which is commonly assigned to the owner of this application, discloses a digital printer that is operable in an inactive mode and in an active mode. In response to receiving a first print request, the Brinsley printer delays initiation of the transition from the inactive mode to the active mode for a delay period of predetermined duration. In response to receiving a second print request during the delay period, the Brinsley printer would initiate the switching from the inactive mode to the active mode immediately. The use of a predetermined delay in Brinsley was intended to increase the potential that multiple print requests would be processed within one switching from the inactive mode to the active mode. The Brinsley scheme has its use in that it provides a simple scheme to reduce the number of the transitions from inactive to active in the device.

In view of the above, it may be beneficial to provide a system and a method that improves upon the Brinsley concept of limiting switching from an inactive mode to an active mode in an image forming device by providing real-time user-interaction with a delay scheme. Such user interaction may afford a user an opportunity to prioritize a requested printing operation appropriately when it is determined that the requested image forming device is currently in an undisturbed power saving mode, including potentially overriding the delay scheme in consideration of the criticality of the image forming operation as assessed by the user. At another end of the spectrum, the user interaction may extend the delay period that may be acceptable to a user or may provide for collection of a specified number of image forming tasks prior to transitioning the image forming device out of the power saving mode to complete all of the image forming operations at one time according to delays that are acceptable to one or more users. In circumstances that have been observed in many office workspace environments, results of a particular user-requested image forming operation in an image forming device may sit in an output tray of the image forming device for extended periods of time before the user who requested the image forming operation retrieves those results. A flexibility in allowing the user to specify no need for the user-requested image forming operation to be undertaken immediately by an image forming device that is determined to be in a power saving mode may prove beneficial.

Exemplary embodiments of the systems and methods according to this disclosure may determine whether a requested image forming device is in a power saving mode at the time that a user requests an image forming operation, e.g., to print a document, be undertaken by the image forming device.

Exemplary embodiments may, based on the above determination, automatically present to the user a formatted user interface page on a display at the user workstation from which the user attempted to direct the image forming operation. The formatted user interface may provide the user with an option to direct the image forming device to delay (hold) executing the requested image forming operation until some additional condition is met.

In exemplary embodiments, the additional condition may be (1) some other command from somewhere else in a network for the image forming device to transition from an inactive mode to an active mode, (2) the passing of a specified period of time (indicated as at least one of a user-selectable elapsed time from initiation or a user-selectable actual clock time), (3) an accumulation of a user-specified number of pending image forming operations directed to the image forming device, and/or (4) the reaching of another like countable parameter, e.g. a total number of accumulated pages directed to the imaged forming device, exceeding some user-selectable threshold.

Exemplary embodiments may provide that, once the image forming device has transitioned out of the power saving mode and into an operating mode due to some other activity or the achieving of a user selected parameter, the user's requested image forming operation will be submitted to the image forming device for execution.

Exemplary embodiments may provide a scheme for commensurate user notification that the user's requested image forming operation has been submitted to the image forming device for execution, or has been completed.

Exemplary embodiments may provide a scheme for timed operations in which, if the user selects to only hold the user's requested image forming operation for a set period of time and the image forming device never comes out of power saving mode until the time expires, the user's requested image forming operation will be submitted to the image forming device for execution when the set period of time expires.

In exemplary embodiments, the user's requested image forming operation may be held at the user's workstation, or otherwise separately at a print server, until the selected image forming device is in an active (operating) state.

Exemplary embodiments may provide that, when the user selects to submit an image forming operation to an image forming device, the image forming device may be queried to determine the current power saving state. If the image forming device is determined to be currently in a power saving mode, the user may be prompted to hold the image forming operation until the image forming device exits the power saving state for another reason.

Exemplary embodiments may provide that the image forming device is queried on a routine and recurring basis, such as every few minutes, to determine the current status of the power saving state of the image forming device. Once it is determined that the image forming device is not in a power saving state, the user's requested image forming operation may be released for execution in the image forming device with notification being sent to the user that the user's requested image forming operation has been executed.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for providing a user-interactive scheme for delaying printing of individual user-requested print operations when an individual image forming device to which a specific user-requested printing operation is directed is determined to be in a power saving mode will be described, in detail, with reference to the following drawings, in which.

DETAILED DESCRIPTION OF THE DISCLOSED EMBODIMENTS

The systems and methods for implementing more efficient printing in image forming devices by providing a user-interactive scheme for delaying printing of individual user-requested print operations when an individual image forming device to which a specific user-requested printing operation is directed is determined to be in a power saving mode that are described in this disclosure will generally refer to this specific utility or function for those systems and methods. Exemplary embodiments described and depicted in this disclosure should not be interpreted as being specifically limited to any particular configuration of the described elements, or to direct or network communication between those elements, or as being specifically limited to any particular intended use. Any advantageous combination of the disclosed concepts for (1) determining that a particular device is in a power saving mode, (2) generating an indication, including an automated user interface, to a user requesting instructions regarding a delay in operation of the device as a result of the determining, (3) receiving a user selection of one of a plurality of presented delay options, and (4) informing the user of execution of a delayed operation in the device, that may prove beneficial to power saving operations in any device is contemplated as being included in this disclosure.

Specific reference to, for example, image forming devices as that term is commonly used throughout this disclosure is intended to make non-limiting reference to common image forming devices including printers, copiers, scanners, facsimile machines, and multi-function devices (MFDs) to which user work product may be directed in order that the work product is output as a result of an image forming operation in image forming device, particularly as some form of hard copy output document. These terms should not be considered as limiting to any particular configuration of the image forming devices, as described. In other words, the term "image forming device" is intended to refer globally to a class of devices and systems that carry out what are generally understood as printing and image forming functions as those functions would be familiar to those of skill in the art.

Figure 1:
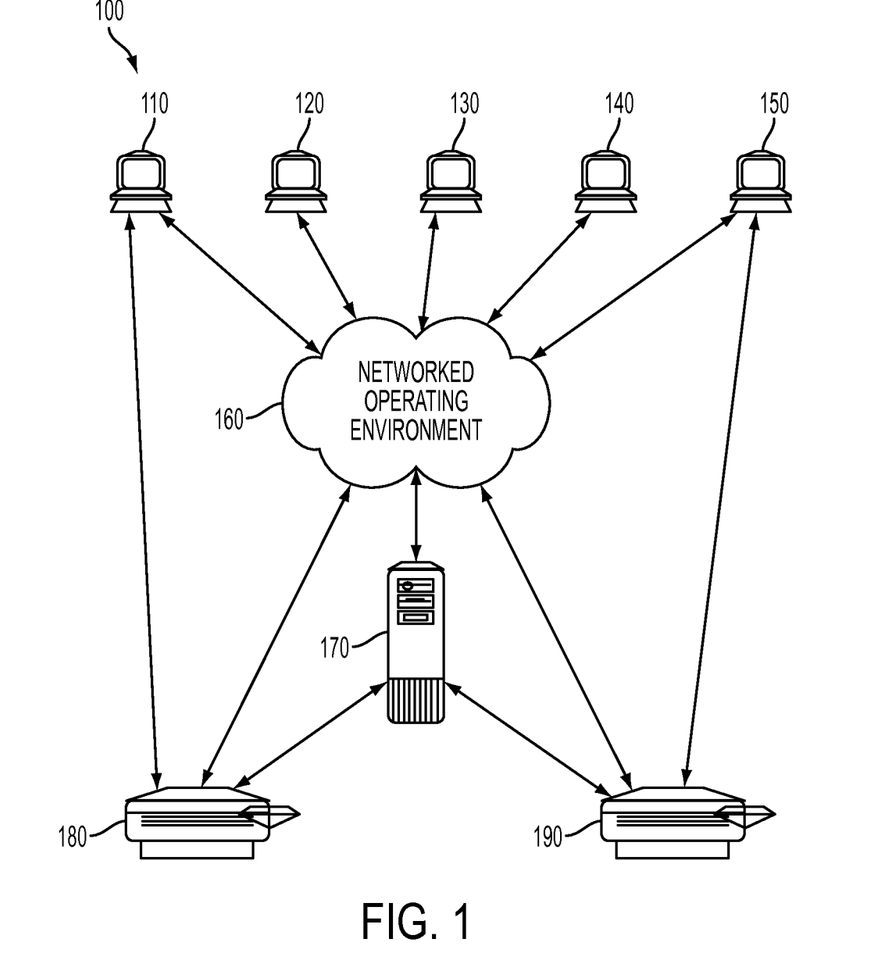
FIG. 1 illustrates a generic communication laydown scheme for a plurality of user workstations in direct and/or networked communication with one or more image forming devices that may benefit from a user interactive delay scheme using the systems and methods according to this disclosure.

FIG. 1 illustrates a generic communication laydown scheme 100 for a plurality of user workstations in direct and/or networked communication with one or more image forming devices that may benefit from a user interactive delay scheme using the systems and methods according to this disclosure. As shown in FIG. 1, a plurality of user workstations 110-150 may be provided to facilitate user interaction with the network and ultimately with a plurality of output devices, including output image forming devices 180,190.

The plurality of user workstations 110-150 may be configured to communicate with the plurality of output devices, including output image forming devices 180,190, by many different communication channels. These communication channels may include one or both of wired and wireless communication links. The communication channels may be direct communication links between one or more of the plurality of user workstations 110-150 and the plurality of output devices, including output image forming devices 180,190. Otherwise, the communication channels may be via a series of individual communication links or sub-links, including via a networked operating environment 160, which may include one or more cloud-based communication components or links, and/or via one or more communication and/or data control and storage servers 170. These examples of typical or usable communication channels between the one or more of the plurality of user workstations 110-150 and the plurality of output devices, including output image forming devices 180,190, are not intended to be, in any way limiting, to those communication channels.

Although depicted in FIG. 1 using identical symbols, it should be understood that the plurality of user workstations 110-150 may be of many different configurations. These different configurations for the user workstations 110-150 may include, but not be limited to, desk top computers or processor units of all types, portable laptop and tablet computing devices, portable handheld devices (including cell phones, smartphones, personal digital assistants (PDAs) and the like), and other comparable devices for wired and wireless (directly or via one or more networks) communications with output devices, such as output image forming devices 180,190.

In order to optimize the rate of power consumption for operations across the population of output devices in a particular organization, and focusing specifically on the several output image forming devices 180,190 that may be employed by the organization, it is recognized that there are two objectives that are in balance. The first objective is to limit power consumption for the image forming devices 180,190 during periods of extended inactivity. The second objective is to limit any extensive delay in an automatic response of the image forming devices 180,190 to tasking by a user to perform an image forming operation. This balance is struck by providing a power saving mode of operation for the image forming devices 180,190, which the image forming devices 180,190 generally automatically enter after measured periods of inactivity. The power saving modes of operation may maintain the image forming devices 180,190 in a warmed-up and monitoring state, at a reduced level of power consumption over being fully operational, for performing the image forming operations.

Because it is recognized that the transition from a power saving mode to a fully operational mode causes spikes in power consumption, limiting the number of transitions may aid in reducing overall power consumption. According to the disclosed schemes, a user may direct an image forming operation via interaction with one or more of a plurality of user workstations 110-150. When a user-directed image forming operation is communicated from the one or more of the plurality of user workstations 110-150, or received by one of the image forming devices 180,190, a determination may be made that the one of the image forming devices 180,190 to which the image forming operation is directed is in a power saving mode.

When a user selects to direct an image forming operation to an image forming device, a determination may be made that the image forming device to which the user directed the image forming operation is in a power saving mode of operation. In such circumstances, the user may be presented with an indication that the image forming device is in the power saving mode of operation. A user interface may automatically be presented to the user to provide the user with a series of options for potentially delaying execution of the user's directed image forming operation in the image forming device. The options may include, for example, an option for the system to hold the user's directed image forming operation in abeyance until some additional condition is met. The additional condition may include an option for the system to hold the user's directed image forming operation until the image forming device transitions out of the power saving mode for another reason or a specified period of time elapses.

Once the image forming device transitions out of the power saving mode due to some other condition being met, the user's directed image forming operation may be submitted to the image forming device for execution, and the user may be notified that the user's directed image forming operation has been submitted to the image forming device for execution. In instances where the user selects to only hold user's directed image forming operation for a set period of time and the image forming device never comes out of power saving mode until the time has expired the user's directed image forming operation will be released to the image forming device when the time has expired.

The disclosed method may hold the user's directed image forming operation at the user's workstation or at a print server until the selected image forming device exits the power saving mode and transitions to a full operating state. When the user selects to submit an image forming operation to an image forming device, the image forming device will be queried to determine the current state of any power saving mode. In instances when the image forming device is determined to currently be in a power saving mode, the user may be prompted to hold the user's directed image forming operation until the image forming device is out of the power saving mode. The image forming device may be queried every few minutes to determine the current state of the power saving mode. Once the system determines that the image forming device is not in a power saving mode, the system may release the user's directed image forming operation and notify the user that the user's directed image forming operation is being executed in the selected image forming device, e.g., the user's document is being/has been printed.

Figure 2:
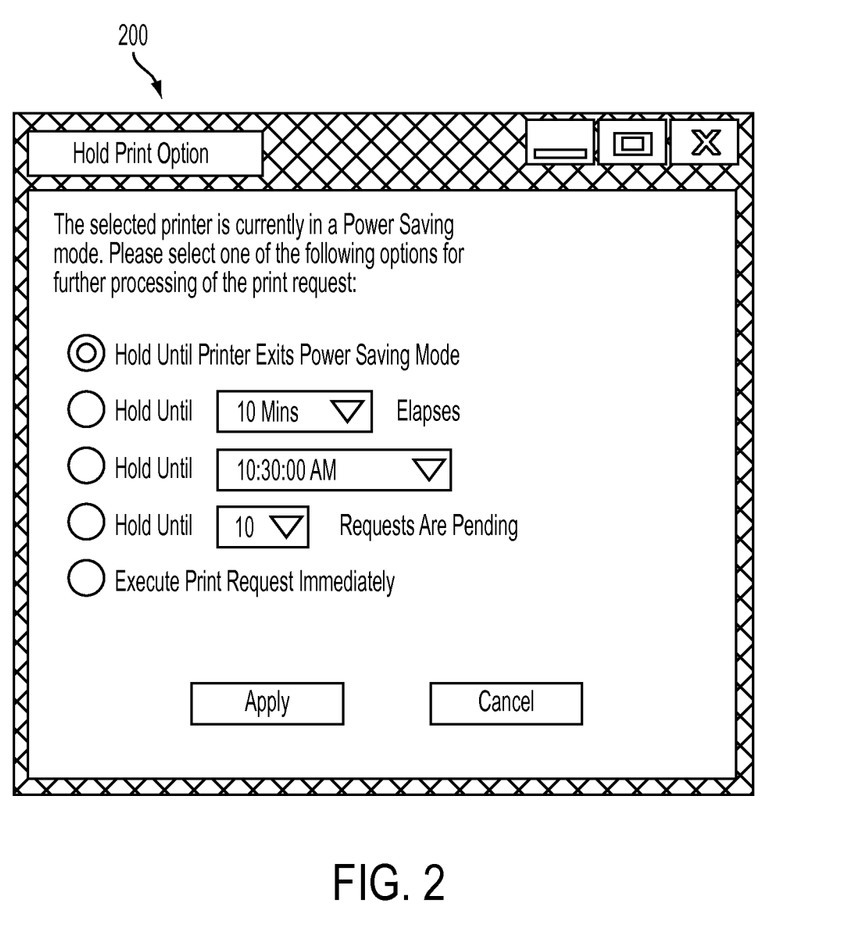
FIG. 2 illustrates an exemplary embodiment of an automated user interface that may be presented to a user at a user workstation when it is determined that an image forming device to which the user has directed an image forming operation is in a power saving mode using the systems and methods according to this disclosure.

FIG. 2 illustrates an exemplary embodiment of an automated user interface 200 that may be presented to a user at a user workstation when it is determined that the image forming device to which the user has directed the image forming operation is in a power saving mode. As shown in FIG. 2, the user may be provided a series of options to (1) hold the user's directed image forming operation until the image forming device exits a power saving mode, (2) hold the user's directed image forming operation until a period of time elapses, (3) hold the user's directed image forming operation until a specific clock time (which may optionally include a date), (4) hold the user's directed image forming operation until a specified number of image forming operations are pending (or alternatively a specified number of accumulated pending pages to be printed) or (5) release the user's directed image forming operation immediately. Once the system has detected that the image forming device is in a ready state, i.e., not in a power saving mode or the commanded time or other condition has been reached, the system may release the user's directed image forming operation to the image forming device to the indicated image forming devices for execution/processing. The user may, in turn, be provided a notification that the user's directed image forming operation has been released. The notification may be, for example, in the form of a standardized dialog box presented on a display screen of the user workstation.

The disclosed embodiments embody a novel manner by which a user may delay their printing until a time the printer is on line and not in a power saving mode. The embodiments may result in cost savings by avoiding printers continuously coming in and out of power saving modes of operation. The embodiments may provide a green solution, which is desirable to users and user entities. Customer satisfaction may be increased through reduced total cost of printing operations.

Figure 3:
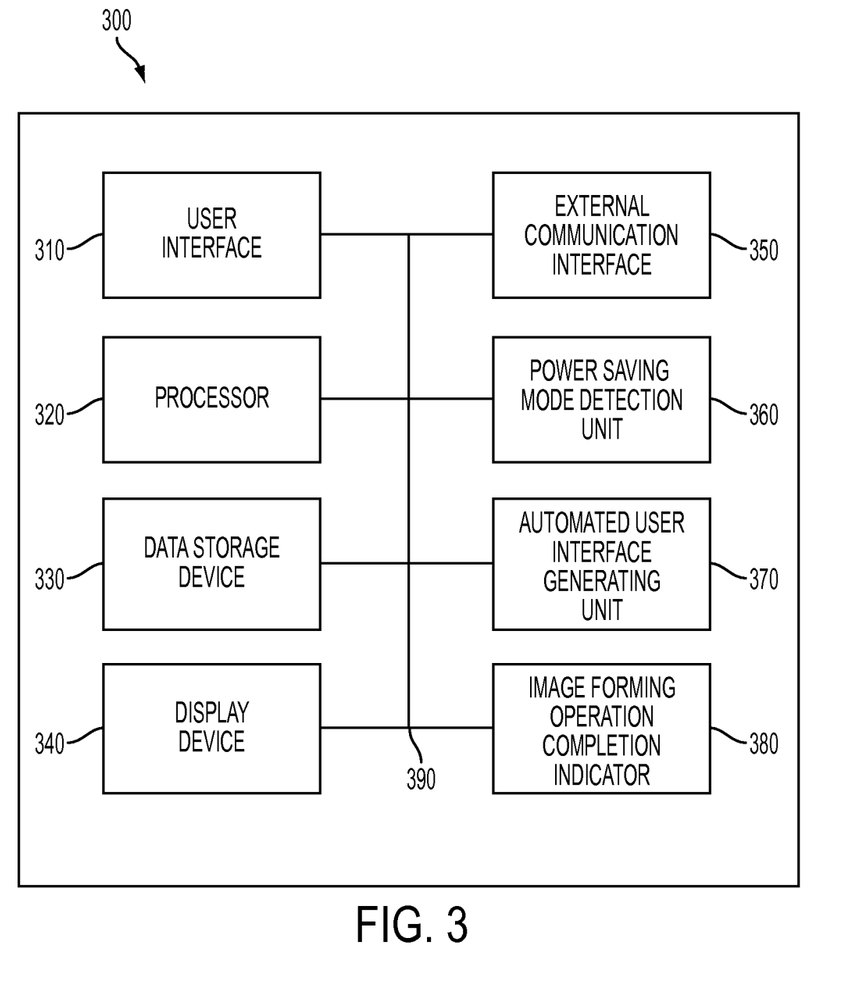
FIG. 3 illustrates a block diagram of an exemplary system for providing a user-interactive scheme for delaying printing in an image forming device according to this disclosure.

FIG. 3 illustrates a block diagram of an exemplary system 300 for providing a user-interactive scheme for delaying printing in an image forming device according to this disclosure. The exemplary system 300 may be embodied, for example, in a user workstation. Elements of the exemplary system 300 may also be provided in a separate server, which may be cloud-based.

The exemplary system 300 may include a user interface 310 by which a user may communicate with the exemplary system 300. The user interface 310 may be configured as one or more conventional mechanisms that permit a user to input information to the exemplary system 300. The user interface 310 may include, for example, an integral or attached keyboard, a pointing device or a touchscreen with "soft" buttons for communicating commands and information to the exemplary system 300. The user interface 310 may alternatively include a microphone by which a user may provide oral commands to the exemplary system 300 to be "translated" by a voice recognition program or otherwise. The user interface 310 may otherwise include any other like device for user operation of, and data exchange with, the exemplary system 300. A user may make inputs via the user interface 310 to directed image forming operation in one or more image forming devices with which the exemplary system 300 communicates. In response to the exemplary system 300 displaying, for example, an automated user interface on a display device 340, when it is determined that the one or more image forming devices with which the exemplary system communicates is in a power saving mode, the user interface 310 may be employed by the user to select one or more displayed options of a condition that may result in delaying execution of the directed image forming operation by the image forming device according to the disclosed schemes.

The exemplary system 300 may include one or more local processors 320 for individually undertaking the processing and control functions that are carried out by the exemplary system 300. Processor(s) 320 may include at least one conventional processor or microprocessor that interprets and executes instructions and processes outgoing and incoming data via different communication links that the exemplary system 300 may use to communicate directly, or via a network environment, with one or more image forming devices. Such communication may be facilitated via one or more external communication interfaces 350 in the exemplary system 300. The external communication interfaces 350 may comprise any communications connections that may appropriately assist the exemplary system 300 to direct image forming operations and the one or more image forming devices, and/or to receive from the one or more image forming devices in indication that a particular device is in a power saving mode of operation. No particular configuration to the external communication interface 350 is intended to be implied that may limit a function of the external communication interface 350.

The exemplary system 300 may include one or more data storage devices 330. Such data storage device(s) 330 may be used to store data, and operating programs or applications to be used by the exemplary system 300, and specifically the processor(s) 320. Data storage device(s) 330 may include a random access memory (RAM) or another type of dynamic storage device that stores information and instructions for execution by the processor(s) 320. Data storage device(s) 330 may also include a read-only memory (ROM), which may include a conventional ROM device or another type of static storage device that stores static information and instructions for execution by the processor(s) 320. The data storage device(s) 330 will generally be those that are integral to the exemplary system 300. Otherwise, the data storage device(s) 330 may include a remote data storage device external to the exemplary system 300 that is in wired or wireless communication with the exemplary system 300 specifically for storing information that may include a user-directed image forming operations that are being held in abeyance until a user-selected condition is met to bring a selected image forming device out of a power saving mode.

The exemplary system 300 may include at least one display device 340 that may be configured as one or more conventional mechanisms that display information to a user of a system such as the exemplary system 300 for operation of the exemplary system 300 in its various operating modes. The at least one display device 340 may be used for displaying, for example, image data and instructions to be provided to an image forming device as the user may direct for conducting image forming operations in the image forming device. Separately, the at least one display device 340 may be used for displaying an automated user interface for providing the user an opportunity to select a particular delay condition for delaying execution of a requested image forming operation in a selected image forming device when it is determined that the selected image forming device is in a power saving mode according to the disclosed schemes.

The exemplary system 300 may include one or more power saving mode detection units 360, which may be associated with the one or more image forming devices with which the exemplary system 300 communicates directly or via networked communication links. The one or more power saving mode detection units 360 may be activated upon a user's direction of an image forming operation in a selected image forming device. The power saving mode detection unit 360 detect and/or return a signal to the exemplary system 300 that the selected image forming device is in a power saving mode.

The exemplary system 300 may include an automated user interface generating unit 370. The automated user interface generating unit 370 may be activated upon a determination that a selected image forming device is in a power saving mode as may be indicated by the signal return by a power saving mode detection unit 360 and the exemplary system 300. Upon activation, the automated user interface generating unit 370 may display on a display device 340 of the exemplary system 300 a predetermined list of user options for additional conditions that should be met in the image forming device prior to bringing the image forming device out of the power saving mode and executing the user-requested image forming operation in the selected image forming device. The user may communicate with the displayed automated user interface generated by the automated user interface generating unit 370 via the user interface 310 of the exemplary system 300 to select one or more options for a condition under which the selected image forming device may exit a power saving condition according to the disclosed schemes.

It should be recognized that the power saving mode detection unit 360 and/or the automated user interface generating unit 370 may operate as stand-alone units associated with the exemplary system 300, or may otherwise be functions of the processor 320 in communication with the one or more data storage devices 330.

The exemplary system 300 may include an image forming operation completion indicator 380 which may format, for example, a dialog box to be displayed on the display device 340 when a signal is received from the power saving mode detection unit 360 that the selected image forming device has exited the power saving mode and has executed the user-requested image forming operation that was delayed according to the user-selected conditions.

All of the various components of the exemplary system 300, as depicted in FIG. 3, may be connected by one or more data/control busses 390. The data/control bus(ses) 390 may provide internal wired or wireless communication between the various components of the exemplary system 300, as all of those components are housed integrally in the exemplary system 300, or as certain of the elements may be remotely housed and be in wired or wireless communication with other components of the exemplary system 300.

It is anticipated that the various disclosed elements of the exemplary system 300 may be arranged in combinations of sub-systems as individual components or combinations of components, but that, regardless of the specific configuration, all of the depicted components may be integral to a single unit that is the exemplary system 300. Otherwise, individual components or combinations of components may be remotely dispersed in multiple locations and in wired or wireless communication with other of the individual components of the exemplary system 300 that may communicate with those components. In other words, no specific configuration as an integral unit or as a support unit, or as several units or sub-systems widely dispersed, for the exemplary system 300 is to be implied by the depiction in FIG. 3.

Further, although depicted as separate individual elements for clarity and ease of understanding, it should be understood that the individually-described functions of the depicted elements may be carried out by one or more processors 320 in the exemplary system 300.

Figure 4:
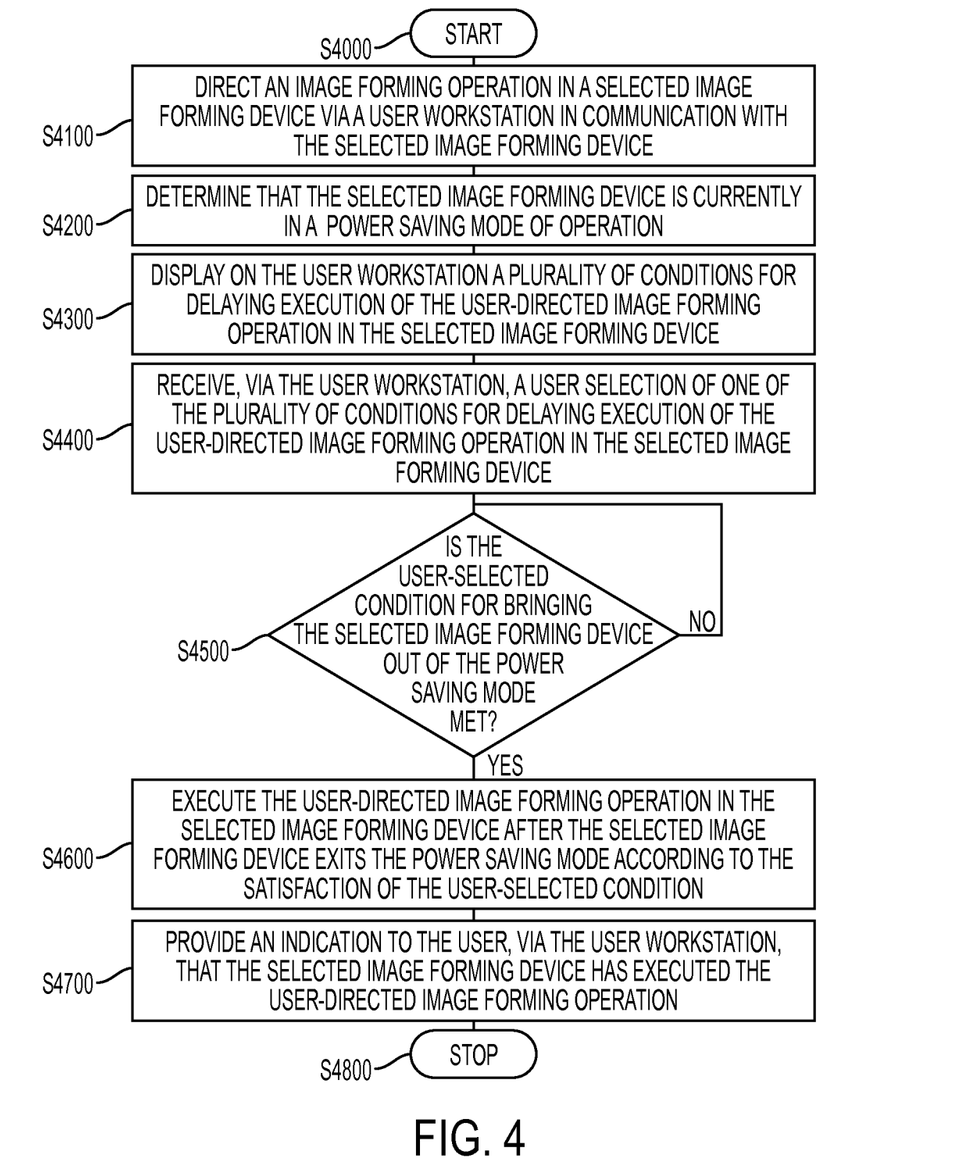
FIG. 4 illustrates a flowchart of an exemplary method for implementing a user-interactive scheme for delaying printing in an image forming device according to this disclosure.

The disclosed embodiments may include an exemplary method for implementing a user-interactive scheme for delaying printing in an image forming device. FIG. 4 illustrates a flowchart of such an exemplary method. As shown in FIG. 4, operation of the method commences at Step S4000 and proceeds to Step S4100.

In Step S4100, an image forming operation may be directed to be executed in a selected image forming device. The direction of the image forming operation may be undertaken via a user workstation in communication with the selected image forming device. Operation of the method proceeds to Step S4200.

In Step S4200, a determination may be made that the selected image forming devices currently in a power saving mode of operation. Operation of the method proceeds to Step S4300.

In Step S4300, when it is determined that the selected image forming device is in a power saving mode of operation, a plurality of conditions for delaying execution of the user-directed image forming operation the selected image forming device may be displayed to a user on the user workstation. These conditions may include, for example: (1) holding the user's directed image forming operation until the image forming device otherwise exits a power saving mode for reasons other than the user's direction of the image forming operation; (2) holding the user's directed image forming operation until a user-selected period of time elapses; (3) holding the user's directed image forming operation until a specific clock time (which may optionally include a date) is reached; (4) holding the user's directed image forming operation until a specified number of image forming operations are pending; (5) holding the user's directed image forming operation until a specified of accumulated pending pages to be printed is reached; or (6) holding the user's directed image forming operation until some other user-specified parameter is achieved. Alternatively, the user may be afforded an option to have the system release the user's directed image forming operation immediately. Operation of the method proceeds to Step S4400.

In Step S4400, a user selection of one of the plurality of conditions for delaying execution of the user-directed image forming operations selected image forming device may be received. The user selection may be received, for example, via the user workstation as the user interacts with the displayed plurality of conditions. Operation of the method proceeds to Step S4500.

Step S4500 is a determination step. In Step S4500, a determination is made whether the user-selected condition from the plurality of conditions for bringing the selected image forming device out of the power saving mode is met.

If in Step S4500, it is determined that the user-selected condition is not met, operation of the method reverts to Step S4500 at regular intervals to monitor the condition being met.

If in Step S4500, it is determined that the user-selected condition is met, operation of the method proceeds to Step S4600.

In Step S4600, the selected image forming device having exited the power saving mode, the selected image forming device will then execute the user-directed image forming operation. This user-directed image forming operation may be one of a plurality of separate image forming operations that the selected image forming device executes, in a compressed sequential order, once the selected image forming device exits the power saving mode according to the disclosed schemes. Operation of the method proceeds to Step S4700.

In Step S4700, a user may be provided an indication, via the user workstation, that the selected image forming device is executed the user-directed image forming operation. The indication may be in the form of a generic dialog box, or may be according to other commonly known indications. Operation of the method proceeds to Step S4800, where operation of the method ceases.

The above-described exemplary systems and methods reference certain conventional components to provide a brief, general description of suitable user workstations and image forming devices that may be combined in a networked communication environment. These combinations of exemplary devices may be particularly adaptable to executing the image forming operation delays schemes according to this disclosure. Those skilled in the art will appreciate that other embodiments of the disclosed subject matter may be practiced with many types of output image forming systems and networked environments in many different configurations.

Although not required, elements of the disclosed schemes may be implemented using hardware components, software elements, firmware, and combinations thereof.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where a particular method step is a necessary precondition to execution of any other method step. Individual method steps may be carried out in sequence, or in parallel, in simultaneous or near simultaneous timing.

Although the above description may contain specific details, they should not be construed as limiting the claims in any way. Other configurations of the described embodiments of the disclosed systems and methods are part of the scope of this disclosure.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for directing image forming operations in an image forming device, comprising:
   sending a signal from a user workstation to an image forming device to direct an image forming operation of a print job request in the image forming device;
   determining that the image forming device is in a power saving mode of operation;
   displaying on the user workstation, in response to the determining that the image forming device is in a power saving mode of operation upon the sending of the print job request, a plurality of options for delaying execution of the print job request in the image forming device beyond a transition time from the power saving mode of operation to a fully operational mode when it is determined that the image forming device is in the power saving mode of operation, wherein at least one of the plurality of options specifies an additional condition to be satisfied prior to an executing of the print job request in the image forming device, the additional condition including a user-selected plural number of print job requests pending for the image forming device; and
   executing the image forming operation according to a selected one of the options.

2. The method of claim 1, further comprising receiving a user input specifying the selected one of the options via a user interface.

3. The method of claim 1, wherein the executing of the image forming operation in the image forming device is inhibited until the additional condition is satisfied.

4. The method of claim 1, wherein the additional condition further includes the image forming device exiting the power saving mode according to an operating input separate and distinct from the signal from the user workstation to direct the image forming operation.

5. The method of claim 1, wherein the additional condition further includes at least one of a user-specified time interval elapsing or a user-specified clock time being reached.

6. The method of claim 1, wherein the plurality of options for delaying execution are displayed on the user workstation as an automated and preformatted user interface.

7. The method of claim 1, further comprising sending a signal to the user interface to indicate that the directed image forming operation is completed by the image forming device.

8. The method of claim 1, wherein the user workstation is an electronic device in wireless communication with the image forming device.

9. The method of claim 8, wherein the electronic device is one of a notebook computer, a tablet computer, a smartphone or a cellular telephone.

10. The method of claim 1, the additional condition further including a user-specified plural number of pages pending for the image forming device.

11. A system for directing image forming operations in an image forming device, comprising:
   a user workstation including a user interface and a display device for formulating and reviewing an image forming operation of a print job request;
   an external communication interface for transmitting the image forming operation to an image forming device and for receiving from the image forming device an indication that the image forming device is in a power saving mode;
   a processor that is programmed to:
      display on the display device of the user workstation, in response to the determining that the image forming device is in a power saving mode of operation upon the sending of the print job request, a plurality of options for delaying execution of the print job request in the image forming device beyond a transition time from the power saving mode to a fully operational mode when the processor determines that the image forming device is in the power saving mode, wherein at least one of the plurality of options specifies an additional condition that the processor must determine is satisfied prior to a controlling the executing of the print job request in the image forming device, the additional condition including a user-selected plural number of individual print job requests pending for the image forming device or a user-specified plural number of pages pending for the image forming device, receive a user input specifying a selected one of the options via the user interface of the user workstation; and
      control an executing of the image forming operation in the image forming device according to the selected one of the options.

12. The system of claim 11, further comprising a data storage device that stores the image forming operation for later execution at an expiration of the delay.

13. The system of claim 11, wherein the processor is further programmed to inhibit the image forming operation in the image forming device until the additional condition is satisfied.

14. The system of claim 11, wherein the additional condition further includes the image forming device exiting the power saving mode according to an operating input separate and distinct from the transmission of the image forming operation via the external communication interface.

15. The system of claim 11, wherein the additional condition further includes at least one of a user-specified time interval elapsing or a user-specified clock time being reached.

16. The system of claim 11, wherein the processor is further programmed to receive a signal that the directed image forming operation is completed by the image forming device and display on the display device of the user workstation an indication that the directed image forming operation is completed.

17. The system of claim 11, the additional condition further including a user-specified plural number of pages pending for the image forming device.

18. A non-transitory computer-readable medium storing instructions which, when executed by a processor, cause the processor to execute a method for directing image forming operations in an image forming device, the method comprising:
   sending a signal from a user workstation to an image forming device to direct an image forming operation of a print job request in the image forming device;
   determining that the image forming device is in a power saving mode of operation;
   displaying on the user workstation, in response to the determining that the image forming device is in a power saving mode of operation upon the sending of the print job request, a plurality of options for delaying execution of the print job request in the image forming device beyond a transition time from the power saving mode of operation to a fully operational mode when it is determined that the image forming device is in the power saving mode of operation, at least one of the plurality of options specifying an additional condition to be satisfied prior to an executing of the print job request in the image forming device, wherein the additional condition includes a user-selected plural number of individual print job requests pending for the image forming device or a user-specified plural number of pages pending for the image forming device; and
   executing the image forming operation according to a selected one of the options.

19. The non-transitory computer-readable medium of claim 18, further comprising receiving a user input specifying the selected one of the options via a user interface.

20. The non-transitory computer-readable medium of claim 18, wherein the executing of the image forming operation in the image forming device is inhibited until the additional condition is satisfied.

21. The non-transitory computer-readable medium of claim 18, wherein the additional condition further includes the image forming device exiting the power saving mode according to an operating input separate and distinct from the signal from the user workstation to direct the image forming operation.

22. The non-transitory computer-readable medium of claim 18, wherein the additional condition further includes at least one of a user-specified time interval elapsing or a user-specified clock time being reached.

23. The non-transitory computer-readable medium of claim 18, further comprising sending a signal to the user interface to indicate that the directed image forming operation is completed by the image forming device.

24. The non-transitory computer-readable medium of claim 18, the additional condition further including a user-specified plural number of pages pending for the image forming device.

* * * * *